(12) United States Patent
Hynes, Jr.

(10) Patent No.: US 6,449,353 B1
(45) Date of Patent: Sep. 10, 2002

(54) TELECOMMUNICATION NUMBER PROCESSING TECHNIQUE FOR A TELEPHONY SERVER

(75) Inventor: Ronald Thomas Hynes, Jr., Avon, IN (US)

(73) Assignee: Interactive Intelligence, Inc., Indianapolis, IN (US)

( * ) Notice: Subject to any disclaimer, the term of this patent is extended or adjusted under 35 U.S.C. 154(b) by 0 days.

(21) Appl. No.: 09/614,004

(22) Filed: Jul. 11, 2000

Related U.S. Application Data (60) Provisional application No. 60/186,190, filed on Mar. 1, 2000, and provisional application No. 60/143,588, filed on Jul. 13, 1999.

(51) Int. Cl.⁷ .............................. H04M 3/42; H04M 3/00
(52) U.S. Cl. ............................ 379/201.01; 379/218.02; 379/265.02
(58) Field of Search ................... 379/201.01–201.12, 379/196, 219, 220.01, 221.01–221.15, 229, 230, 265.01–265.14, 309, 218.01, 218.02, 216.01, 355.01–355.05, 207.02

(56) References Cited

U.S. PATENT DOCUMENTS

| | | | |
|---|---|---|---|
| 5,157,719 A | 10/1992 | Waldman | 379/356 |
| 5,333,188 A | 7/1994 | Bogart et al. | 379/220 |
| 5,343,517 A | 8/1994 | Bogart et al. | 379/219 |
| 5,412,714 A | 5/1995 | Bogart et al. | 379/221 |
| 5,623,541 A | 4/1997 | Boyle et al. | 379/136 |
| 5,883,950 A | 3/1999 | Sonnenberg | 379/220 |
| 5,887,058 A | 3/1999 | Kammath et al. | 379/284 |

Primary Examiner—Ahmad F. Matar
Assistant Examiner—Benny Q. Tieu
(74) Attorney, Agent, or Firm—Woodard, Emhardt, Naughton Moriarty & McNett (57) ABSTRACT

A system for implementing a telecommunication number processing technique is disclosed. The deployed system, e.g. a call center, comprises a CT server and a telecommunication switch. The deployed system can further comprise a computer network. The CT server receives a telecommunication number input from a telecommunication switch or the computer network. The telecommunication number input represents a telecommunication number to dial a telecommunication call to a telecommunication subscriber located within the system, or an external telephone. In response to the telecommunication number input, the CT server provides a standardized number corresponding to the telecommunication number input. The CT server subsequently provides a dial plan corresponding to the standardized number. The dial plan includes a dial string, a dial group, and a dialing classification. The CT server executes the dial plan to transmit the dial string and the dial group to the telecommunication switch if the dialing classification indicates a source of the telecommunication number input has authorization to dial the telecommunication number input.

26 Claims, 6 Drawing Sheets

TELECOMMUNICATION NUMBER PROCESSING TECHNIQUE FOR A TELEPHONY SERVER

REFERENCE TO RELATED APPLICATIONS

This application is related to U.S. Provisional Patent Application No. 60/143,588, filed Jul. 13, 1999, and U.S. Provisional Patent Application No. 60/186,190, filed Mar. 1, 2000, which are each hereby incorporated by reference.

BACKGROUND

The present invention generally relates to a telecommunication number processing technique for a telephony server, and more particularly, but not exclusively, relates to processing by a telephony server of one or more telecommunication number inputs to transact a call to a telecommunication subscriber located within a system, or telephone external to the system.

In a call center, a call center agent typically communicates with customers through in-bound calls, out-bound calls, or both. This communication is often by voice using a telephone handset or headset component of the agent's workstation. Usually, the workstation also includes a computer terminal or personal computer to interface with various application modules. These modules provide the agent information directed to the particular customer service involved. In one common application, a customer's account information is provided on a display viewable by the agent.

The time it takes agents to handle calls and the lapse of time between calls are factors that influence the efficiency of call center operations. Although sometimes at odds with efficiency goals, it is also generally desirable to provide customers as favorable an impression as possible with regard to call center transactions. To manage such competing interests, there is a continuing demand for further advancements in the call center technology area. Particularly, in the advancement of soft coded telephony servers.

SUMMARY

One form of the present invention is a unique telecommunication number processing technique for a telephony server. Another form of the present invention is a unique system, e.g. a call center system, an enterprise system, a service providing system, etc., for processing telecommunication numbers inputs. In some embodiments of such form, one or more telephony servers are operable to execute a dial plan in response to two or more related telecommunication number inputs. In other embodiments of such form, one or more telephony serves are operable to provide a dial string and a dial group corresponding to a telecommunication number input to a telecommunication switch if a dialing classification indicates a source of the telecommunication number input has authorization to dial the telecommunication number input.

Still further forms, objects, features, aspects, benefits, advantages, and embodiments of the present invention shall become apparent from the detailed description and drawings provided herewith.

DETAILED DESCRIPTION OF SELECTED EMBODIMENTS

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
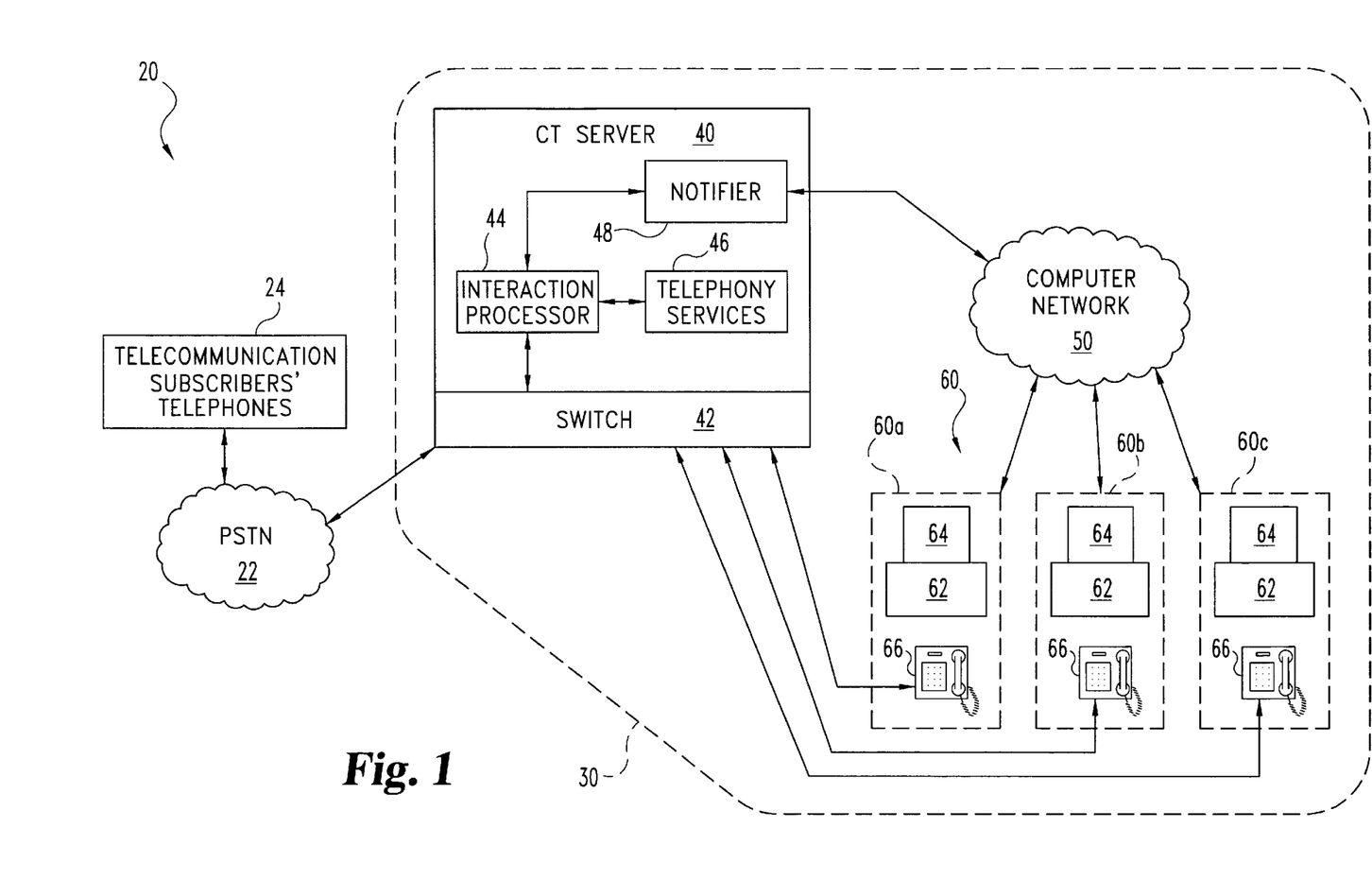
FIG. 1 is a schematic view of a system according to one embodiment of the present invention.

FIG. 1 schematically illustrates call center system 20 of one embodiment of the present invention. System 20 includes Public Switched Telephone Network 22 (hereinafter "PSTN 22") operatively coupled to a plurality of telecommunication subscribers' telephones 24 that are dividedly located within every numbering plan. PSTN 22 is also coupled to a call center 30 of the present invention that includes Computer Telephony server 40 (hereinafter "CT server 40") and a telecommunication switch 42 operatively coupled to PSTN 22 and CT server 40. For this embodiment, telecommunication switch 42 can be in the form of one or more telecommunication processing boards provided by DIALOGIC of 1515 Route Ten, Parsippany, N.J. 07054, USA. Furthermore, while telecommunication switch 42 is illustrated, more telecommunication switches may be utilized in alternative embodiments of call center 30.

CT server 40 includes an interaction processor module 44, a telephony services module 46, and a notifier module 48. Although not shown to preserve clarity, CT server 40 includes one or more processors and one or more types of memory to construct interaction processor 44, telephony services 46, and notifier 48 based upon the principles of the present invention as would occur to those skilled in the art. Each processor may be comprised of one or more components configured as a single unit. Alternatively, when of a multi-component form, a processor may have one or more components located remotely relative to the others. One or more components of each processor may be of the electronic variety defining digital circuitry, analog circuitry, or both. In one embodiment, each processor is of a conventional, integrated circuit microprocessor arrangement, such as one or more PENTIUM II or PENTIUM III processors supplied by INTEL Corporation of 2200 Mission College Boulevard, Santa Clara, Calif. 95052, USA.

Each memory may include one or more types of solid-state electronic memory, magnetic memory, or optical memory, just to name a few. By way of nonlimiting example, each memory may include solid-state electronic Random Access Memory (RAM), Sequentially Accessible Memory (SAM) (such as the First-In, First-Out (FIFO) variety or the Last-In First-Out (LIFO) variety), Programmable Read Only Memory (PROM), Electrically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, each memory may be volatile, nonvolatile, or a hybrid combination of volatile and nonvolatile varieties.

Telephony services 46 interfaces with telecommunication switch 42, and notifier 48 interfaces with a computer network 50. Accordingly, CT server 40 includes interface software and hardware as would occur to those skilled in the art. CT server 40 may also include any oscillator, control clock, signal conditioner, filter, limiter, converter, and other types of operators to implement the present invention as would occur to those skilled in the art. Furthermore, while CT server 40 is illustrated, more servers may be utilized in alternative embodiments.

Computer network 50 can be in the form of a Local Area Network (LAN), Wide Area Network (WAN) such as the Internet, or other network type as would occur to those skilled in the art. It should be recognized that computer network 50 may include one or more elements of PSTN 22. Indeed, in an alternate embodiment, PSTN 22 and computer network 50 are provided as a common network. A number of agent workstations 60a, 60b, 60c (collectively hereinafter "agent workstations 60") are coupled to computer network 50. Agent workstations 60 each include a computer 62 coupled to a display 64. Computers 62 may be of the same type, or a heterogeneous combination of different computing devices. Likewise, displays 64 may be of the same type, or a heterogeneous combination of different visual devices. Although not shown to preserve clarity, each agent workstation 60 may also include one or more operator input devices such as a keyboard, mouse, track ball, light pen, and/or microtelecommunicator, to name just a few representative examples. Also, besides display 64, one or more other output devices may be included such as loudspeaker(s) and/or a printer.

To dial a call to one of telephones 24 or another agent workstation 60, each agent workstation 60 further includes a telephone unit 66 as schematically illustrated in FIG. 1, and a dialing module programmed within computer 62. Telephone units 66 may be in the form of a handset, a headset, or another arrangement as would occur to those skilled in the art. The dialing module may be in the form of a soft phone, or another arrangement as would occur to those skilled in the art. In an alternative embodiment, the dialing module can be programmed within CT server 40 and accessible by each agent workstation 60.

Agent workstations 60 may be arranged identical to one another or may differ from one to the next as would occur to those skilled in the art. In one common arrangement, one workstation is designated for an agent supervisor that has different capabilities than those of other workstations. Furthermore, it should be understood that more or fewer workstations may be utilized than those illustrated.

Call center 30 may also include a predictive dialer with an associated database, a fax server, or any other telecommunication device with associated hardware and software as would occur to those skilled in the art. If included, these telecommunication devices are coupled to either telecommunication switch 42 and/or computer network 50.

Call center 30 incorporates a telecommunication number processing technique of the present invention for transacting calls from call center 30 to telecommunications subscribers' telephones 24 as well as for transacting calls within call center 30. The telecommunication number processing technique is in lieu of CT server 40 having a conventional hard coded technique for parsing telecommunication number inputs for telecommunications subscribers' telephones 24. The telecommunication number processing technique of the present invention includes a standardization procedure 70 (FIG. 2), a configuration procedure 80 (FIG. 3), and an operational routine 100 (FIG. 4). The telecommunication number processing technique can further include additional procedures and routines for facilitating an implementation of the principles of the present invention as would occur to those skilled in the art. For the convenience of description, embodiments of procedure 70, procedure 80, and routine 100 will be subsequently described herein as if call center 30 is located within a (317) area code of the North American Numbering Plan (hereinafter "NANP"). However, it is to be understood that call center 30 can be located within any area code of the NANP or within any other numbering plan. It is to be further understood that CT server 40, telecommunication switch 42, computer network 50, agent workstations 60, and any other components of call center 30 can be collectively located within any numbering plan, dividedly located between any number of numbering plans, or dividedly located within different areas of any numbering plan.

Figure 2:
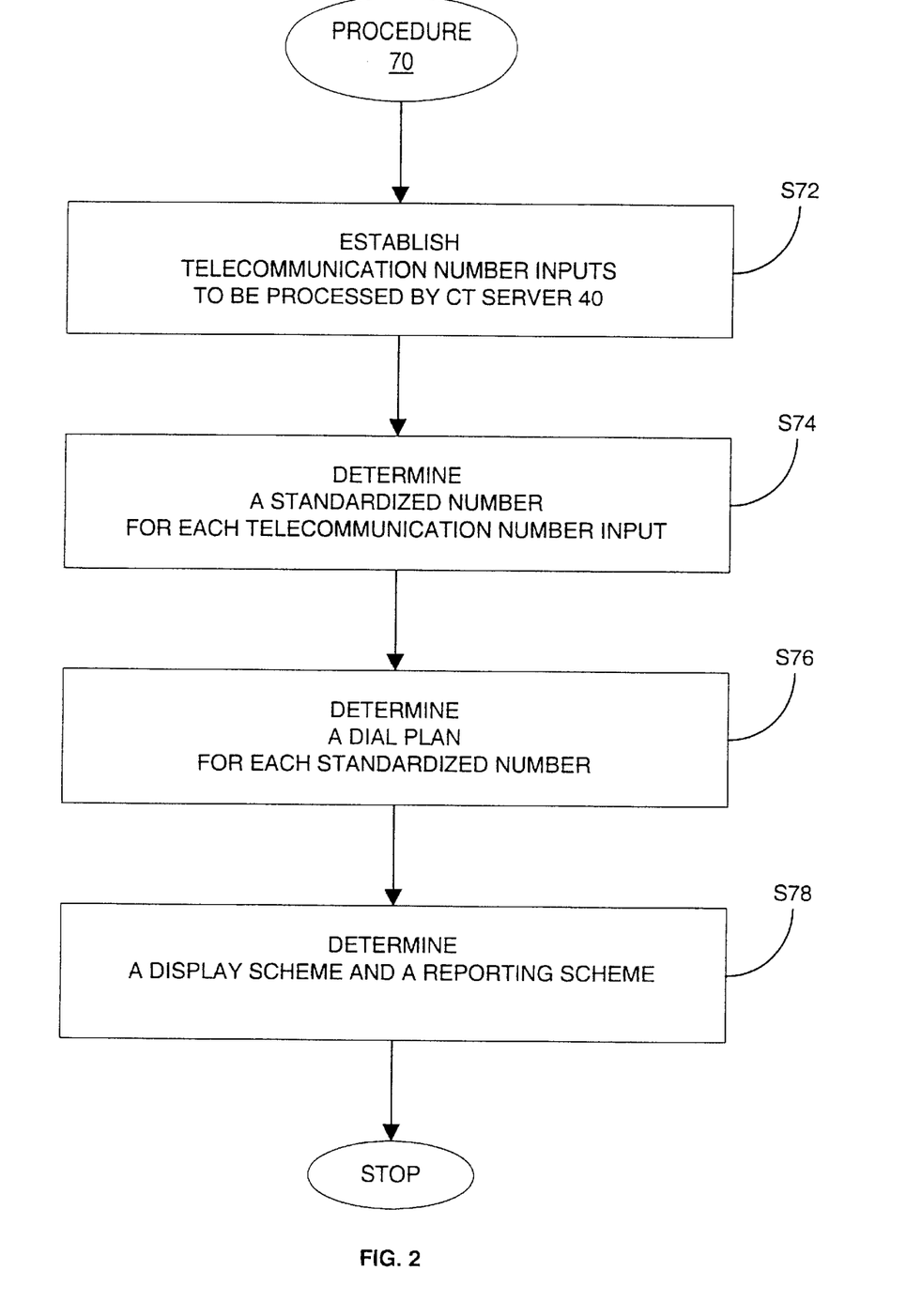
FIG. 2 is a flow chart of one embodiment of a standardization procedure of a telecommunication number processing technique of the present invention.

One embodiment of procedure 70 is shown in FIG. 2. Referring to FIGS. 1 and 2, for each numbering plan, a telephone number format has been established the appropriate numbering plan administrators whereby a telephone number can be assigned to each telecommunication subscriber of that numbering plan. Thus, there are a plurality of potential phone numbers that can be assigned to telecommunication subscribers' telephones 24. During stage S72, for each potential telecommunication number within the various numbering plans, one or more telecommunication number inputs for processing by CT server 40 to dial a call to the corresponding telecommunication subscriber are established. It is to be understood that one or more telecommunication number inputs are established during stage S72 for all potential telecommunication numbers. However, for the convenience of description, the remaining stages of procedure 70 as well as the description of procedure 80 and routine 100 will be described as if the only telecommunication number inputs established during stage S72 are as illustrated in TABLE 1.

TABLE 1

| TELECOMMUNICATION SUBSCRIBER | TELECOMMUNICATION NUMBER | TELECOMMUNICATION NUMBER INPUT(S) |
|---|---|---|
| Call Center 30 Operator | 0 | 0 |
| Agent Workstation 60 | 130 | 130 /130 |
| PSTN 22 Operator | 00 | 00 |
| NANP Emergency Operator | 911 | 911 |

TABLE 1-continued

| TELECOMMUNICATION SUBSCRIBER | TELECOMMUNICATION NUMBER | TELECOMMUNICATION NUMBER INPUT(S) |
|---|---|---|
| NANP (317) Information Operator | (317) 555-1212 | 411 |
| | | 1-411 |
| | | 555-1212 |
| | | 317-555-1212 |
| | | 1-317-555-1212 |
| | | +1-317-555-1212 |
| NANP (317) Subscriber (Local to CT server 40) | (317) 872-3000 | 872-3000 |
| | | 317-872-3000 |
| | | 1-317-872-3000 |
| | | +1-317-872-3000 |
| NANP (317) Subscriber (Long Distance to CT server 40) | (317) 219-8987 | 219-8987 |
| | | 317-219-8987 |
| | | 1-317-219-8987 |
| | | +1-317-219-8987 |
| NANP (919) Subscriber | (919) 443-3876, Ext. 131 | 919-443-3876/131 |
| | | 1-919-443-3876/131 |
| | | +1-919-443-3876/131 |
| NANP '800' Toll Free Subscriber | 1-800-289-8447 | 800-289-8447 |
| | | 1-800-289-8447 |
| | | +1-800-289-8447 |
| NANP '900' Service Subscriber | 1-900-438-4357 | 900-438-4357 |
| | | 1-900-438-4357 |
| | | +1-900-438-4357 |
| An International Subscriber | 011-44-15-23-42-23-45 | +44-15-23-42-23-45 |
| | | 011-44-15-23-42-23-45 |
| | | 011-+44-15-23-42-23-45 |

Procedure 70 proceeds to stage S74 upon completion of stage S72. During stage S74, a standardized number is determined for each telecommunication number input established during stage S72. Each standardized number corresponds to one or more telecommunication number inputs. Each standardized number includes numeric characters and/or symbolic characters, and serves as a basis for determining one dial plan for the corresponding telecommunication number input(s). As such, each standardized number preferably includes the numeric character(s) that identifies the corresponding telecommunication number. TABLE 2 illustrates TABLE 1 telecommunication numbers with corresponding telecommunication number input(s) and exemplary standardized numbers.

TABLE 2

| TELE-COMMUNICATION NUMBER | TELE-COMMUNICATION NUMBER INPUT(S) | STANDARDIZED NUMBER |
|---|---|---|
| 0 | 0 | 0 |
| 130 | 130 | /130 |
| | /130 | |
| 00 | 00 | 00 |
| 911 | 911 | 911 |
| (317)555-1212 | 411 | 1411 |
| | 1-411 | |
| | 555-1212 | |
| | 317-555-1212 | |
| | 1-317-555-1212 | |
| | +1-317-555-1212 | |
| (317)872-3000 | 872-3000 | +13178723000 |
| | 317-872-3000 | |
| | 1-317-872-3000 | |
| | +1-317-872-3000 | |
| (317)219-8987 | 219-8987 | +13172198987 |
| | 317-219-8987 | |
| | 1-317-219-8987 | |
| | +1-317-219-8987 | |
| (919)443-3876, Ext. 131 | 919-443-3876/131 | +19194433876131 |
| | 1-919-443-3876/131 | |
| | +1-919-443-3876/131 | |

TABLE 2-continued

| TELE-COMMUNICATION NUMBER | TELE-COMMUNICATION NUMBER INPUT(S) | STANDARDIZED NUMBER |
|---|---|---|
| 1-800-289-8447 | 800-289-8447 | +18002898447 |
| | 1-800-289-8447 | |
| | 1-800-289-8447 | |
| 1-900-438-4357 | 900-438-4357 | +19004384357 |
| | 1-900-438-4357 | |
| | 1-900-438-4357 | |
| 011-44-15-23-42-23-45 | +44-15-23-42-23-45 | +441523422345 |
| | 011-44-15-23-42-23-45 | |
| | 011-+44-15-23-42-23-45 | |

Procedure 70 proceeds to stage S76 upon completion of stage S74. During stage S76, a dial plan is determined for each standardized number established during stage S74. Each dial plan includes a dial string, a dial group, and a dialing classification. A dial string is a string of dialing characters that are transmitted by CT server 40 to telecommunication switch 42 whereby telecommunication switch 42 can transact the call to the corresponding telecommunication subscriber of TABLE 1. A dial group is a descriptive name for one or more eligible lines and/or channels that telecommunication switch 42 utilizes to route the call to the corresponding telecommunication subscriber of TABLE 1. A dialing classification is a descriptive name of the dial string. TABLE 3 illustrates exemplary dial strings, dial groups, and dialing classifications to the TABLE 2 standardized numbers.

TABLE 3

| STANDARDIZED NUMBER | DIALING STRING | DIALING GROUP | DIALING CLASSIFICATION |
|---|---|---|---|
| 0 | 0 | Internal | Company Operator |
| 130 | 130 | Internal | Intercom |
| 00 | 00 | Outbound Local | Operator |
| 911 | 911 | Any Outbound | Emergency |
| 1411 | 1411 | Outbound Local | Information |
| +13178723000 | 8723000 | Outbound Local | Local |
| +13172198987 | 13172198987 | Outbound Long | Long Distance |
| +19194433876131 | 19194433876/131 | Outbound Long | Long Distance |
| +18002898447 | 18002898447 | Outbound Local | Toll Free |
| +19004384357 | 19004384357 | Outbound Local | Service |
| +441523422345 | 011441523422345 | Outbound Long | International |

In an alternative embodiment of procedure 70, a telecommunication number input can be established during stage S72 as a speed dial entry as would occur to those skilled in the art. However corresponding dial string determined during stage S76 should still be dialing characters that are transmitted by CT server 40 to telecommunication switch 42 whereby telecomunication switch 42 can transact the call to the corresponding telecommunication subscriber TABLE 1. For example, a telecommunication number input of 222 as a speed dial entry can be established for telecommunication number (317) 872-2000 of TABLE 1, yet the corresponding dial string should still be 8723000.

In another alternative embodiment of procedure 70, a dial string can include any prefix or suffix, e.g. "1", "9", long distance carrier, etc., required to facilitate the transaction of the call by telecomunication switch 42 as would occur to those skilled in the art.

In another alternative embodiment of procedure 70, a dialing classification can also be a descriptive name of an action to be performed by CT server 40 that is associated with one or more dial strings. For example, if an administrator of call center 30 desires to prevent CT server from processing dial string 19004384357 of TABLE 3, the associated dialing classification can be termed "Blocked Numbers".

Procedure 70 proceeds to a stage S78 upon completion of stage S76. During stage S78, a display scheme and a reporting scheme are determined. A display scheme is a plan for displaying a telecommunication number of TABLE 1 on displays 64 in response to CT server receiving a corresponding telecommunication number input of TABLE 1. In one embodiment, a reporting scheme is a plan for logging each transaction of a call to a telecommunication subscriber. For example, a reporting scheme may be determined to log each transaction of a call to the telecommunication subscriber having telecommunication number (317) 872-3000 of TABLE 1. In another embodiment, a reporting scheme is a plan for logging each transaction of calls to telecommunication subscribers having a common attribute. For example, a reporting scheme may be determined to log each transaction of calls to telecommunication subscribers having telecommunication numbers of TABLE 1 that includes the NANP (317) area code.

Procedure 70 terminates upon completion of stage S78. The completion of stages S72–S78 of procedure 70 were sequentially described herein. In alternative embodiments, stages S72–S78 can be concurrently or dividedly completed as would occur to those skilled in the art. Additionally, procedure 70 can be repetitively implemented as would occur to those skilled in the art.

Figure 3:
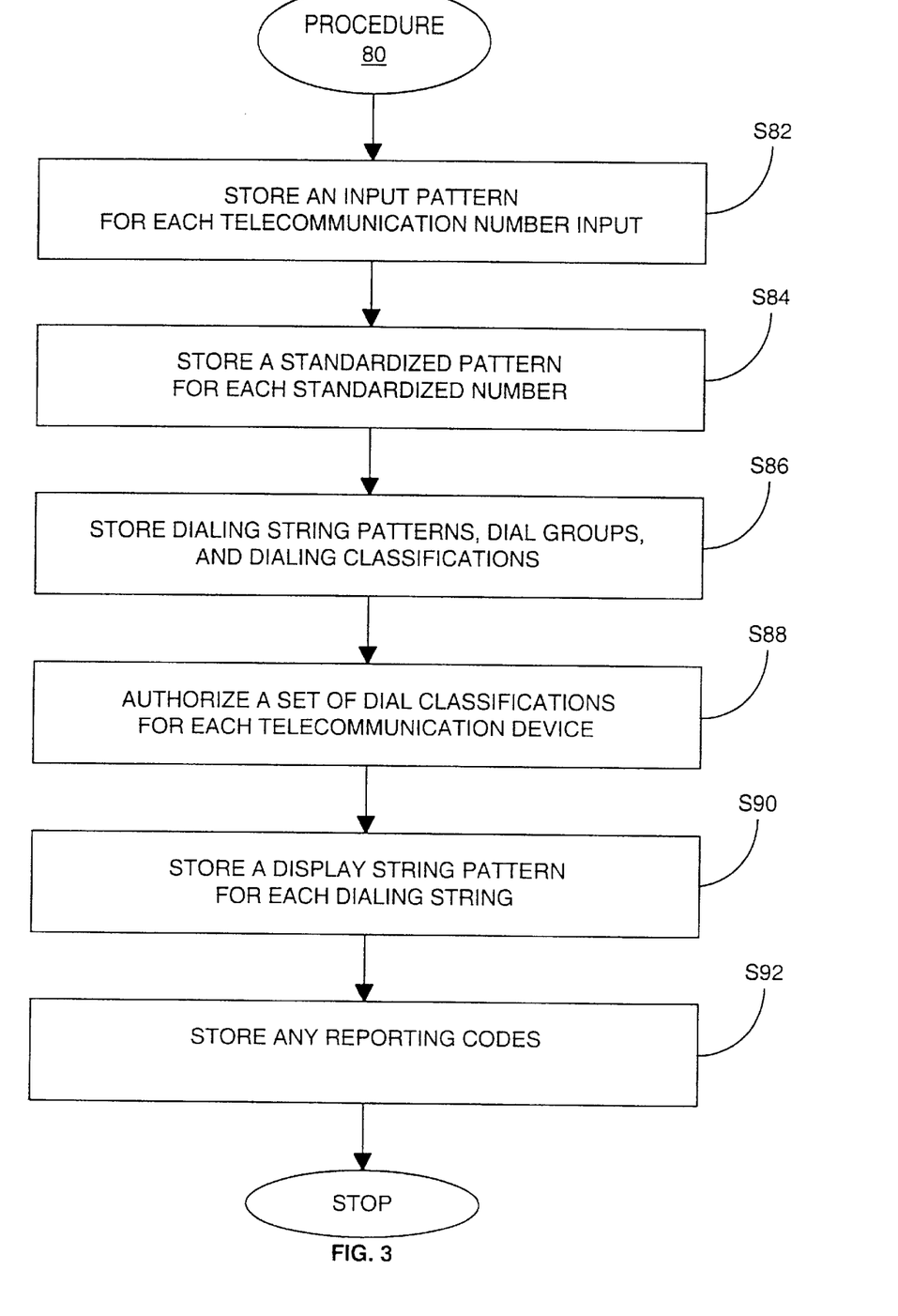
FIG. 3 is a flow chart of one embodiment of a configuration procedure of the telecommunication number processing technique of the present invention.
Figure 4:
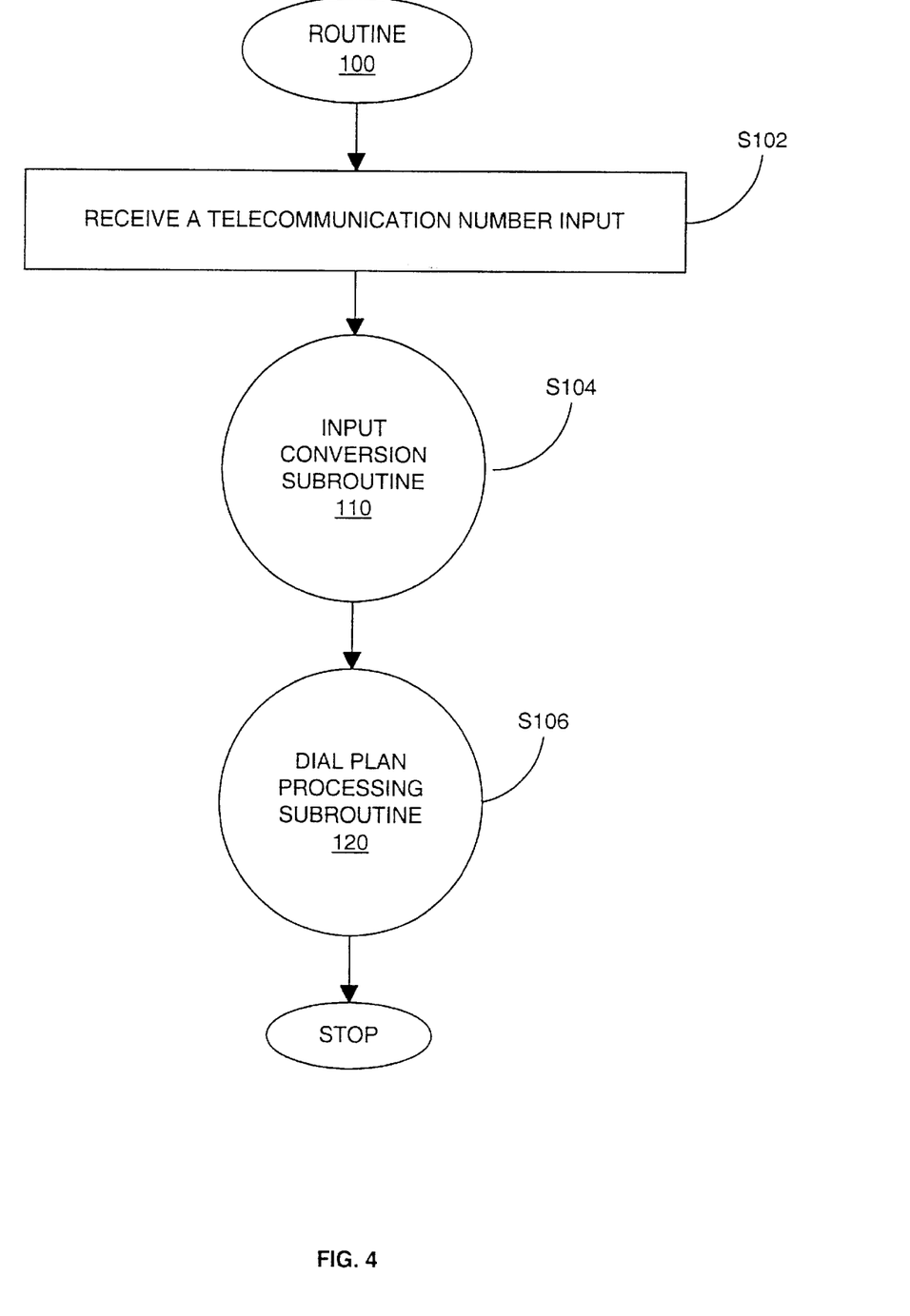
FIG. 4 is a flow chart of one embodiment of an operational routine of the telecommunication number processing technique of the present invention.

One embodiment of procedure 80 is shown in FIG. 3. Referring to FIGS. 1 and 3, an implementation of procedure 80 configures CT server 40 in accordance with procedure 70 to enable the execution of routine 100 (FIG. 4). During stage S82 of procedure 80, an input pattern for each telecommunication number input of TABLE 1 is stored within CT server 40. Each input pattern corresponds to one or more telecommunication number inputs. The input patterns include numeric characters, symbolic characters, and/or wildcard characters. TABLE 4 illustrates one embodiment of wildcard characters:

TABLE 4

| WILDCARD CHARACTER | REPRESENTATION |
|---|---|
| 'X' 'x' | Represents a single numeric character in the range of 0–9 |
| 'Y' or 'y' | Represents a single numeric character in the range of 1–9 |
| 'N' or 'n' | Represents a single numeric character in the range of 2–9 |
| '?' | Represents one or more dialable symbolic characters, e.g. 0–9 '#', and '*' |
| 'Z' or 'z' | Represents zero or more trailing characters of any value |

Wildcard 'Z' or 'z' is the last character of an input pattern or any other pattern of the present invention. TABLE 5 illustrates an exemplary listing of input patterns corresponding to the telecommunication number inputs of TABLE 1.

TABLE 5

| TELECOMMUNICATION NUMBER INPUT(S) | INPUT PATTERN (Wildcard Characters) |
|---|---|
| 911 | 911 |
| 0 | 0 |
| 00 | 00 |
| 411 | 411 |
| 1411 | 1411 |
| 555-1212 | 5551212 |
| 317-555-1212 | 3175551212 |
| 1-317-555-1212 | 13175551212 |
| +1-317-555-1212 | +13175551212 |
| 827-3000 | NxxxxxxZ |
| 219-8987 | |
| 317-872-3000 | 317NxxxxxZ |
| 317-219-8987 | |
| 1-317-872-3000 | 1317NxxxxxxZ |
| 1-317-219-8987 | |
| +1-317-872-3000 | +1317NxxxxxxZ |
| +1-317-219-8987 | |
| 1-919-443-3876/131 | 1NxxNxxxxxxZ |
| 1-800-289-8447 | |
| 1-900-438-4357 | |
| +1-919-443-3876/131 | +1NxxNxxxxxxZ |
| +1-800-289-8447 | |
| +1-900-438-4357 | |
| +44-15-23-42-23-45 | +Z |
| 011-44-15-23-42-23-45 | 011z |
| 011-+44-15-23-42-23-45 | 011 + z |
| 130 | xxx |
| /130 | /Z |
| Unknown | Z |

Input pattern Z is stored for any unknown telecommunication number input received by CT server 40. Such telecommunication number inputs do not correspond to any of the telephone number formats from the various numbering plans, and thus are not established during stage S72 of procedure 70 (FIG. 2). The input patterns of TABLE 5 are sequentially stored within CT server 40 in a priority order as shown to facilitate an expedient transaction of the more urgent calls to the corresponding telecommunication subscribers.

Procedure 80 proceeds to stage S84 upon completion of stage S82. During stage S84, a standardized pattern for each standardized number of TABLE 2 is stored within CT server 40. The standardized patterns include numeric characters, and/or symbolic characters. The standardized patterns also include wildcard characters or ordinal positions of wildcard characters. TABLE 6 illustrates exemplary standardized patterns corresponding to the standardized numbers of TABLE 2. It is to be appreciated by those skilled in the art that the standardized patterns of TABLE 6, whether using wildcard syntax or ordinal syntax, are based on the input patterns of TABLE 5.

Procedure 80 proceeds to stage S86 upon completion of stage S84. During stage S86, dial strings corresponding to the dial strings of TABLE 3 are stored within CT server 40. The dial group and dialing classifications of TABLE 3 are also stored within CT server 40 during stage S86. An additional dial group All Outbound and an additional dialing classification Unknown are also stored within CT server 40 to correspond to input pattern Z of TABLE 5. The dial strings include numeric characters and/or symbolic characters. The dial string patterns also include wildcard characters or ordinal positions of wildcard characters. TABLE 7 illustrates exemplary dial string patterns for the corresponding dial strings of TABLE 3. It is to be appreciated by those skilled in the art that the dial string patterns of TABLE 7, whether using wildcard syntax or ordinal syntax, are based on the input patterns of TABLE 5.

TABLE 6

| STANDARDIZED NUMBER | STANDARDIZED PATTERN (Wildcard Characters) | STANDARDIZED PATTERN (Ordinal Positions) |
|---|---|---|
| 0 | 0 | 0 |
| /130 | /Z | /{2} |
| 00 | 00 | 00 |
| 911 | 911 | 911 |
| 1411 | 1411 | 1411 |
| +13178723000 | +1317NxxxxxxZ | +1317{6}{7}{8}{9}{10}{11}{12}{13} |
| +13172198987 | +1NxxNxxxxxxZ | +1{3}{4}{5}{6}{7}{8}{9}{10}{11}{12}{13} |
| +19194433876131 | | |
| +18002898447 | +1800NxxxxxxZ | +1800{6}{7}{8}{9}{10}{11}{12}{13} |
| +19004384357 | +1900NxxxxxxZ | +1900{6}{7}{8}{9}{10}{11}{12}{13} |
| +441523422345 | +Z | +{2} |
| Unknown | Z | {1} |

Standardized pattern Z is stored for any unknown telecommunication number input received by CT server 40, and thus corresponds to input pattern Z of TABLE 5.

TABLE 7

| DIAL STRING | DIAL STRING PATTERN (Wildcard Characters) | DIAL STRING PATTERN (Ordinal Positions) |
|---|---|---|
| 0 | 0 | 0 |
| 130 | Z | {2} |
| 00 | 00 | 00 |
| 911 | 911 | 911 |
| 1411 | 1411 | 1411 |
| 8723000 | NxxxxxxZ | {1}{2}{3}{4}{5}{6}{7}{8} |
| 13172198987 | 1317NxxxxxxZ | 1317{5}{6}{7}{8}{9}{10}{11}{12} |
| 19194433876131 | 1NxxNxxxxxxZ | 1{2}{3}{4}{5}{6}{7}{8}{9}{10}{11}{12} |
| 18002898447 | 1800NxxxxxxZ | 1800{5}{6}{7}{8}{9}{10}{11}{12} |
| 19004384357 | 1900NxxxxxxZ | 1900{5}{6}{7}{8}{9}{10}{11}{12} |
| 011441523422345 | 011Z | 011{1} |
| Unknown | Z | {1} |

Dial string pattern Z is stored for any unknown telecommunication number input received by CT server 40, and thus corresponds to input pattern Z of TABLE 5.

Procedure 80 proceeds to stage S88 upon completion of stage S86. During stage S88, a set of the dialing classifications is authorized for each agent workstation 60 of call center 30. TABLE 8 illustrates an exemplary listing of the dialing classifications of TABLE 3 under an onautorize column labeled "Available" and an authorized column labeled "Currently Selected" sa displayable on displays 64.

TABLE 8

| AVAILABLE | CURRENTLY SELECTED |
|---|---|
| | Company Operator |
| | Intercom |
| Long Distance | Operator |
| 800 Toll Free | Emergency |
| 900 Service | Information |
| International | Local |

Procedure 80 proceeds to stage S90 upon completion of stage S88. During stage S90, a display string pattern for each dial string pattern of TABLE 7 is stored within CT server 40. TABLE 9 illustrates exemplary display string patterns for the corresponding dial strings of TABLE 3. It is to be appreciated by those skilled in the art that the display string patterns of TABLE 9, whether using wildcard syntax or ordinal syntax, are based on the input patterns of TABLE 5.

TABLE 9

| DIAL STRING | DISPLAY STRING PATTERN (Wildcard Characters) | DISPLAY STRING PATTERN (Ordinal Positions) |
|---|---|---|
| 0 | 0 | 0 |
| 130 | /Z | /{2} |
| 00 | 00 | 00 |
| 911 | 911 | 911 |
| 1411 | 411 | 1411 |
| 8723000 | Nxx-xxxxZ | {1}{2}{3}-{4}{5}{6}{7}{8} |
| 13172198987 | (317)Nxx-xxxxZ | (317){5}{6}{7}-{8}{9}{10}{11}{12} |
| 19194433876131 | (Nxx)NxxxxxxZ | ({2}{3}{4}){5}{6}{7}-{8}{9}{10}{11}{12} |
| 18002898447 | (800)NxxxxxxZ | (800) {5}{6}{7}-{8}{9}{10}{11}{12} |
| 19004384357 | (900)NxxxxxxZ | (900) {5}{6}{7}-{8}{9}{10}{11}{12} |
| 011441523422345 | +Z | +{2} |
| Unknown | Z | {1} |

Procedure 80 proceeds to stage S92 upon completion of stage S90. During stage S92, one or more reporting codes for implementing the reporting scheme determined during stage S78 of procedure 70 (FIG. 2) are stored within CT server 40. TABLE 10 illustrates exemplary reporting codes for the corresponding standardized numbers of TABLE 3. It is to be appreciated by those skilled in the art that the reporting codes of TABLE 10 are based on the input patterns of TABLE 5.

TABLE 10

| STANDARDIZED NUMBER(S) | REPORTING CODE(S) (Ordinal Positions) |
|---|---|
| 0 | {1} |
| 130 | {1}{2}{3} |
| 00 | {1}{2} |
| 911 | {1}{2}{3} |
| 1411 | {1}{2}{3}{4} |
| +13178723000 | {3}{4}{5} For Area Code |
| +13172198987 | {6}{7}{8} For Local Exchange |
| +19194433876/131 | |
| | {3}{4}{5} Toll Code |
| +18002898447 | {6}{7}{8} For Local Exchange |
| +19004384357 | {3}{4}{5} Toll Code |
| | {6}{7}{8} For Local Exchange |
| +441523422345 | {2}{3} For Country Code |
| | {4}{5} For City Code |

Procedure 80 terminates upon completion of stage S92. The completion of stages S82–S92 of procedure 80 were sequentially described herein. In alternative embodiments, stages S82–S92 can be concurrently or dividedly completed as would occur to those skilled in the art. Additionally, procedure 80 can be repetitively implemented as would occur to those skilled in the art.

One embodiment of routine 100 is shown in FIG. 4. Referring to FIGS. 1 and 4, routine 100 begins with a reception of a telecommunication number input by CT server 40 during stage S102. CT server 40 receives the telecommunication number input in one of three ways. First, telephone units 66 can be utilized to transmit the telecommunication number input to telephony services 46 via telecommunication switch 42 as would occur to those skilled in the art. Second, the dialing module of an agent workstation 60 can be utilized to transmit the telecommunication number input to notifier 48 via computer network 50 as would occur to those skilled in the art. Finally, if included, additional telecommunication devices of call center 30 like a predictive dialer or a fax server can transmit or direct a transmission of the telecommunication number input to either telephony services 46 or notifier 48 as would occur to those skilled in the art.

Upon receipt of the telecommunication number input by CT server 40, notifier 48 provides a telecommunication call request notification to interaction processor 44 during stage S102. Upon receipt of the telecommunication call request notification by interaction processor 44, interaction processor 44 proceeds to execute input conversion subroutine 110 during stage S104. An execution of input conversion subroutine 110 provides a standardized number of TABLE 2 that corresponds to the telecommunication number input received during stage S102. Interaction processor 44 subsequently proceeds to execute dial plan processing subroutine 120 during stage S106. An execution of dial plan processing subroutine 120 results in a transacting of a call to a corresponding telecommunication subscriber if the dialer of the telecommunication number input had authorization to place the call, or a cancellation of a call to the corresponding telecommunication subscriber if the dialer did not have authorization.

Figure 5:
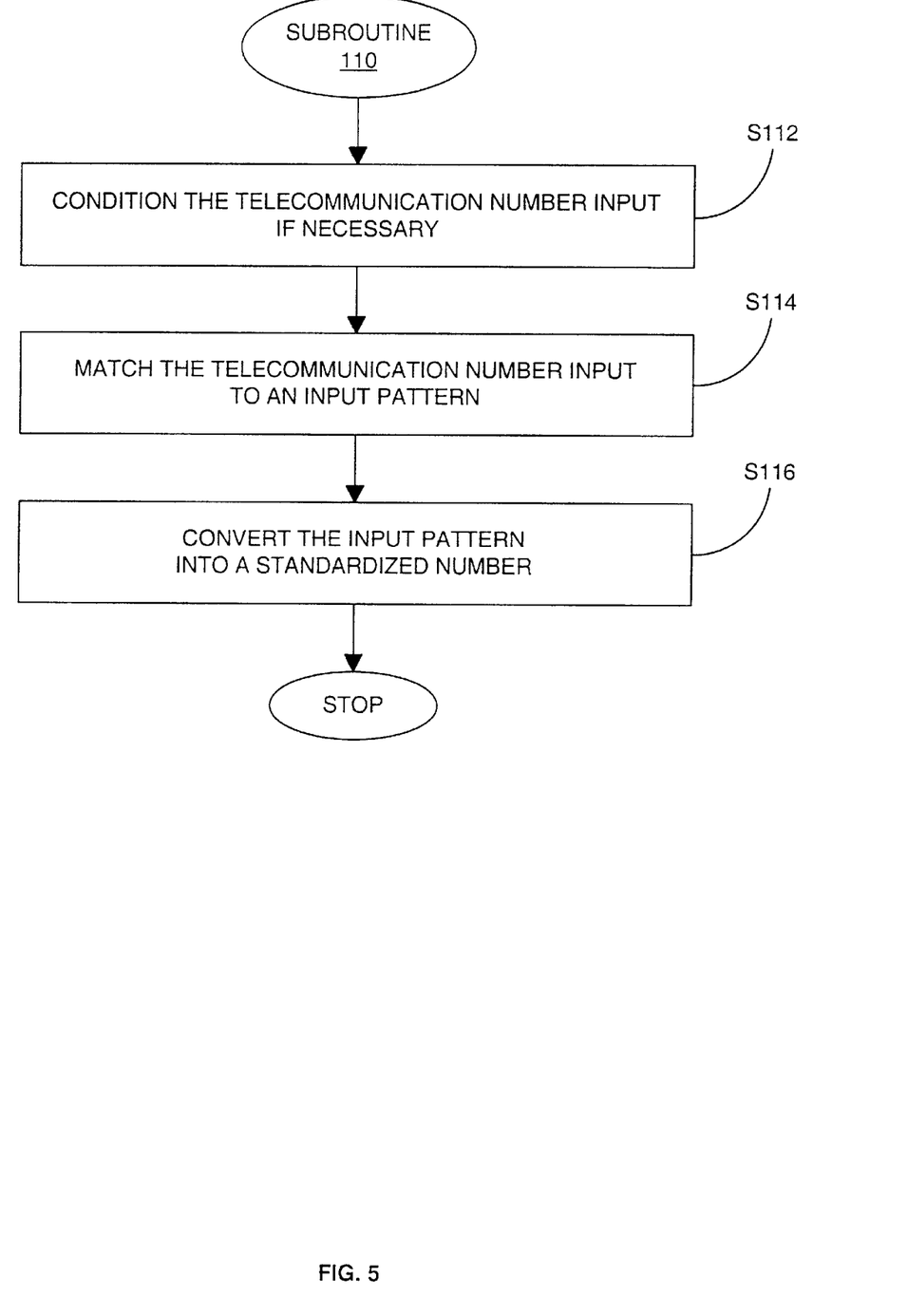
FIG. 5 is a flow chart of one embodiment of an input conversion subroutine of the operational routine of FIG. 4.

One embodiment of subroutine 110 is shown in FIG. 5. Referring to FIGS. 1 and 5, during stage S112, interaction processor 44 conditions the telecommunication number input received during stage S102 of routine 100 (FIG. 4) if the telecommunication number input includes any formatting characters and alphabetic characters. Specifically, the formatting characters like dashes, parenthesis and spaces are stripped from the telecommunication number input. The alphabetic characters are mapped to numeric characters. Any symbolic characters included within the telecommunication number input are preserved, e.g. '/', "#", "*", '+', and "@". Upon the completion of stage S112, the telecommunication number input, whether conditioned or not, specifies the numeric codes that are required by telecommunication switch 42 to dial the telecommunication call to the appropriate telecommunication subscriber. TABLE 11 illustrates an exemplary conditioning of several telecommunication numbers inputs including formatting characters, alphabetic characters, and/or symbolic characters:

TABLE 11

| RECEIVED TELECOMMUNICATION NUMBER INPUTS | CONDITIONED TELECOMMUNICATION NUMBER INPUTS |
|---|---|
| 872-3000 | 8723000 |
| (919) 578-4009/131 | 9195784009/131 |
| 1-800-BUY-THIS | 18002898447 |
| +44-15-23-42-23-45 | +441523422345 |

Interaction processor 44 then sequentially proceeds to match the telecommunication number input to a corresponding input pattern of TABLE 5 during stage S114 and to convert the corresponding input pattern into a corresponding standardized number of TABLE 2 during stage 116. For example, if the telecommunication number input received during stage S102 of routine 100 (FIG. 4) is telecommunication number input 872-3000 of TABLE 1, interaction processor 44 scans TABLE 5 from the top-down during stage S114 until it reaches input pattern NxxxxxxZ and then converts input pattern NxxxxxxZ during stage S116 into standardized number +13178723000 of TABLE 2.

Also by example, if the telecommunication number input received during stage S102 of routine 100 (FIG. 4) is telecommunication number input +44-15-23-42-23-45 of TABLE 1, interaction processor 44 scans TABLE 5 from the top-down during stage S114 until it reaches input pattern +Z and then converts the input pattern +Z during stage S116 into standardized number +441523422345 of TABLE 2. Additionally by example, if the telecommunication number input received during stage S102 of routine 100 (FIG. 4) is unknown, interaction processor 44 scans TABLE 5 from the top-down during stage S114 until it reaches input pattern Z and then converts the input pattern Z during stage S116 into telecommunication number input which will serve as its own standardized number. Subroutine 110 terminates upon completion of stage S116.

In an alternate embodiment of procedure 80 and subroutine 110, the input patterns of TABLE 5 are subdivided into a plurality of tables during stage S82 of procedure 80 and stages S114 and S116 are sequentially repeated for each table. In yet another embodiment, additional input patterns are added to the plurality of tables as would occur to those skilled in the art.

Figure 6:
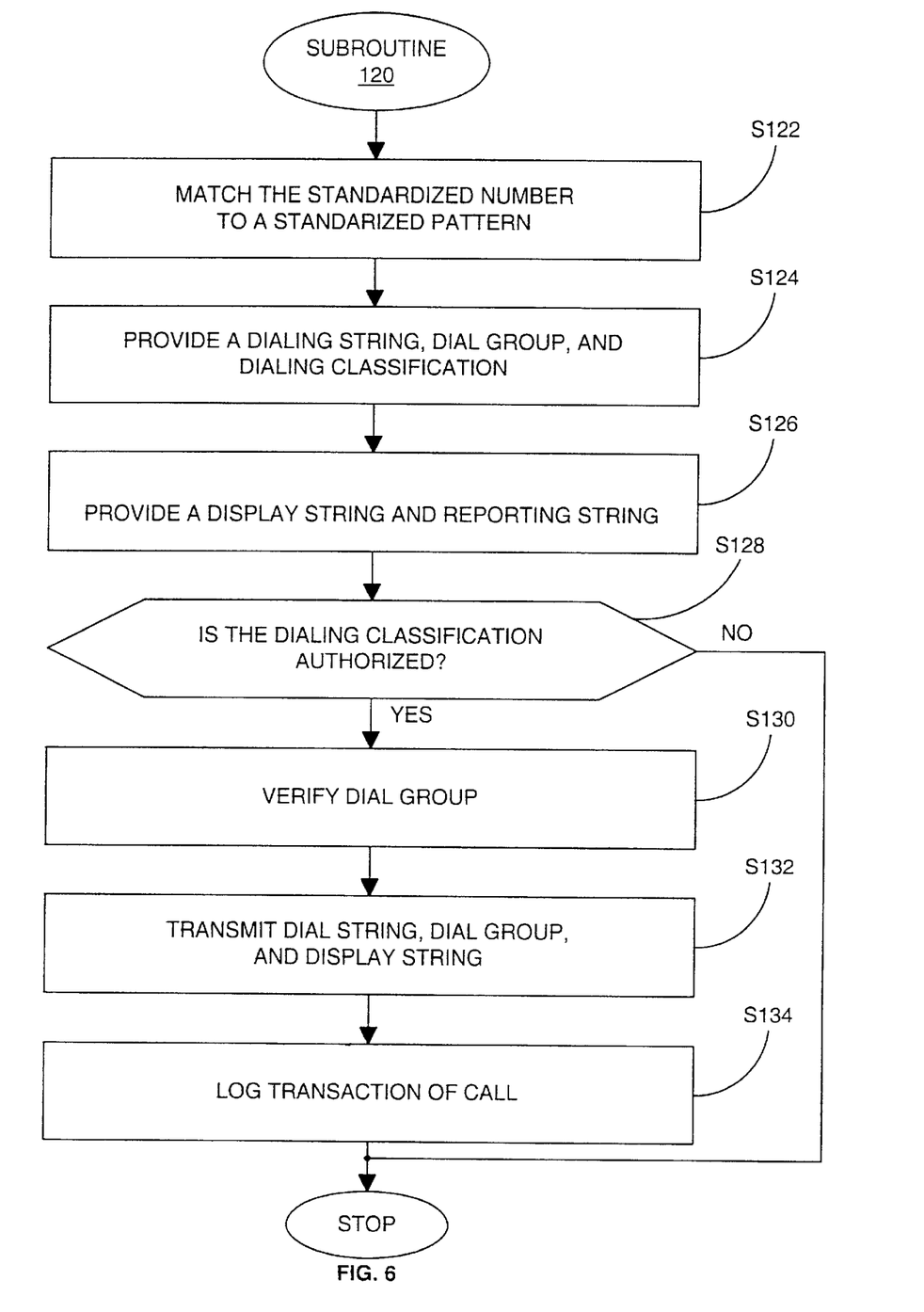
FIG. 6 is a flow chart of one embodiment of a dial plan processing subroutine of the operational routine of FIG. 4.

One embodiment of subroutine 120 is shown in FIG. 6. Referring to FIGS. 1 and 6, during stage S122, interaction processor 44 sequentially proceeds to match the standardized number of stage S116 to a standardized pattern of TABLE 6 during stage S122; to provide a dial string, dial group, and dialing classification of TABLE 3 during stage S124; and to provide a display string of TABLE 9 and a reporting code of TABLE 10 during stage S126. For example, if the standardized number of stage S122 is standardized number +13178723000 of TABLE 2, interaction processor 44 scans TABLE 6 from the top-down during stage S122 until it reaches standardized pattern +1317NxxxxxxZ. Interaction processor 44 then proceeds during stage S124 to utilize the corresponding dial string pattern 317NxxxxxxZ of TABLE 7 to provide dial string 8723000 of TABLE 3, dial group Outbound Local of TABLE 3, and dialing classification LOCAL of TABLE 3. Interaction processor 44 subsequently utilizes the corresponding display pattern of TABLE 9 and the corresponding reporting code(s) of TABLE 10 during stage S126 to provide display string 872-200 of TABLE 10 and to provide a reporting string 872 for the local exchange.

Also by example, if the standardized number of stage S122 is standardized number +441523422345 of TABLE 2, interaction processor 44 scans TABLE 6 from the top-down during stage S122 until it reaches standardized pattern +Z. Interaction processor 44 then proceeds during stage S124 to utilize the corresponding dial string pattern 011Z of TABLE 7 to provide dial string 011441523422345 of TABLE 3, dial group Outbound Long of TABLE 3, and dialing classification International of TABLE 3. Interaction processor 44 subsequently utilizes the corresponding display pattern of TABLE 9 and the corresponding reporting code(s) of TABLE 10 during stage S126 to provide display string +441523422345 and to provide a reporting string 44 for the country code and a reporting string of 15 for the city code.

Additionally by example, if the standardized number of stage S122 is an unknown standardized number, interaction processor 44 scans TABLE 6 from the top-down during stage S122 until it reaches standardized pattern Z. Interaction processor 44 then proceeds during stage S124 to utilize the corresponding dial string pattern Z of TABLE 7 to provide the unknown standardized number as the dial string, the dial group All Outbound, and dialing classification Unknown of TABLE 3. Interaction processor 44 subsequently utilizes the corresponding display pattern of TABLE 9 during stage S126 to provide to provide the unknown standardized number as the display string. Interaction processor 44 further provides the unknown standardized number as a reporting string during stage S126.

Subroutine 120 proceeds to conditional stage S128 upon completion of stages S122–126. During stage S128, interaction processor 44 determines if the corresponding dialing classification provided during stage S124 is authorized. In testing the condition, interaction processor 44 first ascertains the source of the telecommunication number input. Interaction processor 44 then proceeds to scan an authorization table, e.g. TABLE 8, corresponding to the source to ascertain whether the dialing classification is authorized. If the source does not have authorization to transact a call corresponding to the dialing classification, then subroutine 120 terminates. If the source does have authorization to transact a call corresponding to the dialing classification, then subroutine 120 proceeds to stage S130.

During stage S130, interaction processor 44 verifies that the line(s) and/or channel(s) listed under the dial group provided during stage S124 are valid. Interaction processor 44 substitutes new line(s) and/or channel(s) for any invalid line or channel. Interaction processor 44 then proceeds to stage S132 to transmit the dial string provided during stage S124 and the dial group verified during stage S132 to telecommunication switch 42 whereby telecommunication switch 42 can transact the call to the corresponding telecommunication subscriber. Interaction processor 44 additionally transmits the display string provided during stage S126 to an agent workstation 60 during stage S132. Interaction processor 44 then proceeds to stage S134 to utilized the reporting string provided during stage S126 to log a transaction of the call. Subroutine 120 terminates upon completion of stage 134.

Stage S122 is omitted in an alternative embodiment of subroutine 120. Accordingly, additional input patterns as would occur to those skilled in the art are added to TABLE 5 during stage S82 of procedure 80 (FIG. 3) to ensure that each telecommunication number input established during stage S72 of procedure 70 (FIG. 2) can be matched during stage S112 of subroutine 110 (FIG. 5).

Referring again to FIG. 1, an enterprise system as an alternative embodiment of the present invention comprises CT server 40, telecommunication switch 42, and conventional components as would occur to those skilled in the art. Additionally, a service providing system as an alternative embodiment of the present invention comprises CT server 40, telecommunication switch 42, and conventional components as would occur to those skilled in the art. Both the enterprise system embodiment and the service providing system embodiment implement the principles of the telecommunication number processing technique of the present invention.

All publications, patents, and patent applications cited in this specification are herein incorporated by reference as if each individual publication, patent, or patent application were specifically and individually indicated to be incorporated by reference and set forth in its entirety herein. While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected.

What is claimed is:

1. A method of processing telephone calls at a call center with a telephony server, comprising:
   receiving a telecommunication number input from a source with the telephony server;
   conditioning the telecommunication number input;
   matching the telecommunication number input after said conditioning with a standardized number format by comparing the telephone number input with a plurality of input patterns that are sequentially ordered by priority;
   converting the telecommunication number input to a standardized number based on the standardized number format in response to said matching the telecommunication number input with the standardized number format;
   matching the standardized number to a standard pattern by comparing the standardized number to a plurality of standard patterns;
   determining the source has authorization from a dialing classification that corresponds to the standard pattern in response to said matching the standardized number to the standard pattern; and
   transmitting a dial string that corresponds to the standard pattern to a telecommunication switch.

2. The method of claim 1, wherein said conditioning includes:
   stripping formatting characters from the telecommunication number input; and
   converting alphabetic characters to numeric characters in the telecommunication number input.

3. The method of claim 1, wherein the input patterns include numeric and wildcard characters.

4. A method of processing telephone calls at a call center, comprising:
   establishing at least two disparate telecommunication number inputs each having a plurality of disparately sequenced characters, wherein each of the at least two disparate telecommunication number inputs is individually capable of completing a call to a telecommunication subscriber;
   determining a same standardized number corresponding to both the at least two disparate telecommunication number inputs;
   determining a dial plan corresponding to the standardized number;
   executing the dial plan to control a transaction of the call to the telecommunication subscriber in response to any one of the at least two disparate telecommunication number inputs;
   wherein said dial plan includes a dial string, a dial group and a dialing classification; and
   wherein said executing includes transmitting said dial string and said dial group to at least one telecommunication switch if said dialing classification indicates a source of the call has authorization to dial the call.

5. The method of claim 4, further comprising:
   storing an input pattern within at least one telephony server, said input pattern corresponding to a first telecommunication number input of said at least two disparate telecommunication number inputs.

6. The method of claim 4, further comprising:
   storing a standardized pattern within at least one telephony server, said standardized pattern corresponding to said standardized number.

7. The method of claim 4, further comprising: storing a dial string pattern within at least one telephony server, said dial string pattern corresponding to said dial string.

8. The method of claim 4, wherein said dial group includes at least one line or channel to be utilized by said at least one telecommunication switch to route said call to said telecommunication subscriber.

9. The method of claim 4, wherein said dialing classification is utilized by at least one telephony server to control said transmitting said dial string and said dial group to said at least one telecommunication switch.

10. The method of claim 4, further comprising:
    determining a display scheme corresponding to said dial plan.

11. The method of claim 10, further comprising:
    storing a display string pattern within at least one telephony server, said display string pattern corresponding to said display scheme.

12. The method of claim 4, further comprising:
    determining a reporting scheme corresponding to said dial plan.

13. The method of claim 12, further comprising:
    storing at least one reporting code within at least one telephony server, said at least one reporting code corresponding to said reporting scheme.

14. A method, comprising:
    establishing at least two disparate telecommunication number inputs for at leant one telephony server to a transact a call to a telecommunication subscriber;
    providing a first telecommunication number input of said at least two disparate telecommunication number inputs to said at least one telephony server;
    operating said at least one telephony server to provide a standardized number corresponding to said at least two disparate telecommunication number inputs in response to said first telecommunication number input;

operating said at least one telephony server to execute a dial plan in response to said standardized number;

wherein said dial plan controls a transaction of said call to said telecommunication subscriber in response to any one of said at least two disparate telecommunication number inputs;

wherein said dial plan includes a dial string, a dial group, and a dialing classification; and operating said at least one telephony server to transmit said dial string and said dial group to at least one telecommunication switch if said dialing classification indicates a source of said first telecommunication number input has authorization to dial said first telecommunication number input.

15. The method of claim 14, further comprising:

operating said at least one telephony server to transmit a display string to at least one workstation if said dialing classification indicates said source of said first telecommunication number input has authorization to dial said first telecommunication number input, said display string corresponding to said dial string.

16. The method of claim 14, further comprising:

operating said at least one telephony server to log a transaction of said call to said telecommunication subscriber if said dialing classification indicates said source of said first telecommunication number input has authorization to dial said first telecommunication number input.

17. A system, comprising:

at least one telecommunication switch operable to transact a call to a telecommunication subscriber; and at least one telephony server storing a standardized number, said standardized number corresponding to at least two disparate telecommunication number inputs, said at least one telephony server further storing a dial plan corresponding to said standardized number, said dial plan including a dial string, a dial group, and a dialing classification, wherein said at least one telephony server is operable to transmit said dial string and said dial group to at least one telecommunication switch in response to said dialing classification indicating a source of the call has authorization to dial.

18. The system of claim 17, wherein said at least one telephony server stores an input pattern corresponding to a first telecommunication number input of said at least two disparate telecommunication number inputs.

19. The system of claim 17, wherein said at least one telephony server stores a standardized pattern corresponding to said standardized number.

20. The system of claim 17, wherein said at least one telephony server stores a dial string pattern corresponding to said dial string.

21. The system of claim 17, wherein said dial group includes at least one line or channel to be utilized by said at least one telecommunication switch to route said call to said telecommunication subscriber.

22. The system of claim 17, wherein said dialing classification is utilized by said at least one telephony server to control a transmission of said dial string and said dial group to said at least one telecommunication switch.

23. The system of claim 17, wherein said at least one telephony server stores a display string pattern corresponding to said dial string.

24. The system of claim 17, wherein said at least one telephony server stores at least one reporting code corresponding to said standardized number.

25. A system, comprising:

at least one telecommunication switch operable to transact a call to a telecommunication subscriber;

at least one telephony server operable to receive a telecommunication number input of at least two disparate telecommunication number inputs to dial said call to said telecommunication subscriber and to provide a dial plan in response to said telecommunication number input, said dial plan including a dial string, a dial group, and a dialing classification, wherein said at least one telephony server is further operable to transmit said dial string and said dial group to said at least one telecommunication switch in response to said dialing classification indicating a source of said telecommunication number input has authorization to dial said telecommunication number input; and at least one agent workstation, wherein said at least one telephony server is further operable to transmit a display string to said at least one agent workstation if said dialing classification indicates a source of said telecommunication number input has authorization to dial first telecommunication number input.

26. The system of claim 25, wherein said at least one telephony server is further operable to log a transaction of said call to said telecommunication subscriber if said dialing classification indicates a source of said telecommunication number input has authorization to dial first telecommunication number input.

* * * * *